(12) United States Patent
Langenfeld et al.

(10) Patent No.: US 10,863,861 B2
(45) Date of Patent: Dec. 15, 2020

(54) WAFFLE SANDWICH MAKER AND METHOD OF PREPARING A FOOD PRODUCT WITH THE WAFFLE SANDWICH MAKER

(71) Applicant: General Mills, Inc., Minneapolis, MN (US)

(72) Inventors: Roberta M Langenfeld, Saint Paul, MN (US); Ralph A Stenvik, Plymouth, MN (US); Lisa Swanson, Bloomington, MN (US); Karla M Fuentes, St. Louis Park, MN (US); Michele K. Wolf, St. Louis Park, MN (US); Zachary Harder, Crystal, MN (US); Todd A Rasmussen, North Branch, MN (US); Bruce D Larson, Monticello, MN (US); Shannyn Stuart, Wheaton, IL (US)

(73) Assignee: General Mills, Inc., Minneapolis, MN (US)

( * ) Notice: Subject to any disclaimer, the term of this patent is extended or adjusted under 35 U.S.C. 154(b) by 565 days.

(21) Appl. No.: 15/363,695

(22) Filed: Nov. 29, 2016

(65) Prior Publication Data
US 2018/0146823 A1    May 31, 2018

(51) Int. Cl.
*A47J 37/06* (2006.01)
(52) U.S. Cl.
CPC ............................... *A47J 37/0611* (2013.01)
(58) Field of Classification Search
CPC . A47J 37/06; A47J 37/0611; A47J 2037/0617
USPC .... 99/372, 376, 377, 379, 380, 382; 100/61, 100/194–195, 202, 235–236, 258 A, 295
See application file for complete search history.

(56) References Cited

U.S. PATENT DOCUMENTS

| | | | |
|---|---|---|---|
| 246,194 A | 8/1881 | Patton | |
| 495,872 A | 4/1893 | Ball | |
| D75,432 S | 6/1928 | Keller | |
| 1,754,800 A | 4/1930 | Preston | |
| 2,026,286 A | 12/1935 | Samuels | |
| D202,960 S | 11/1965 | Carpenter | |
| 3,799,047 A | 3/1974 | Freeman | |
| D237,935 S | 12/1975 | Nygren | |
| 4,176,591 A | 12/1979 | Power | |
| D376,723 S | 12/1996 | Asner | |
| 5,937,742 A | 8/1999 | Steeb et al. | |

(Continued)

*Primary Examiner* — Dana Ross
*Assistant Examiner* — James F Sims, III
(74) *Attorney, Agent, or Firm* — Diederiks & Whitelaw, PLC; John L. Crimmins, Esq.

(57) ABSTRACT

A waffle sandwich maker includes first and second waffle plates which contact a food product during preparation of the food product. The first waffle plate includes a plurality of protrusions defining a plurality of channels, a female connector having a hole, a male connector having a protrusion and a first spacer extending inward relative to the plurality of protrusions. The pluralities of protrusions and channels create depressions and ridges in the food product. The protrusion of the male connector and the hole of the female connector of the first waffle plate mate with a hole of a female connector and a protrusion of a male connector of the second waffle plate. The first spacer contacts the second waffle plate during preparation of the food product, which includes an outer dough encapsulating a filling, to maintain the first waffle plate spaced at least approximately 0.5 inches from the second waffle plate.

18 Claims, 7 Drawing Sheets

(56) References Cited

U.S. PATENT DOCUMENTS

| | | |
|---|---|---|
| 5,983,784 A | 11/1999 | Goldberg |
| D513,150 S | 12/2005 | Asner |
| D643,678 S | 8/2011 | Lavy et al. |
| 7,989,012 B2 | 8/2011 | Gambino |
| D667,681 S | 9/2012 | Carsten |
| D692,296 S | 10/2013 | Cooper |
| D730,118 S | 5/2015 | Fast et al. |
| D751,342 S | 3/2016 | Steeb |
| 2002/0073855 A1 | 6/2002 | Gambino et al. |
| 2005/0223907 A1 | 10/2005 | Albritton et al. |
| 2008/0245241 A1 | 10/2008 | Rosset et al. |
| 2009/0025570 A1 | 1/2009 | Larson |
| 2014/0007780 A1 | 1/2014 | Fast et al. |
| 2016/0213197 A1 | 7/2016 | Zhan et al. |

WAFFLE SANDWICH MAKER AND METHOD OF PREPARING A FOOD PRODUCT WITH THE WAFFLE SANDWICH MAKER

BACKGROUND OF THE INVENTION

The present invention pertains to waffle plates and, more particularly, to waffle plates for use in the production of filled waffle-like food products.

Breakfast foods are large market both in the United States and throughout the world. One popular type of breakfast food is the breakfast sandwich. Typically, a breakfast sandwich includes bread, egg and cheese. Optionally, meat and other toppings can also be included. Recently, some less traditional breakfast sandwiches, such as the McGriddle®, have also seen a rise in popularity. Regardless of the particular type, it is beneficial for breakfast food products to be portable and easy to eat since such products are typically eaten while a consumer is getting ready for or on the way to work or school. This is true both for products prepared in the consumer's home and for products purchased, for example, in a fast food or convenience store setting.

In view of the above, it would be desirable to provide a non-traditional breakfast food product that is portable and easy to eat. Preferably, the food product is a waffle-like breakfast sandwich having a filling. It is also preferred that the plates used to prepare the sandwich do not cause the filling to leak out, provide for quick and even heating, are easy to clean and are usable with existing production equipment.

SUMMARY OF THE INVENTION

The present invention is directed to a waffle sandwich maker and a method of preparing a food product with the waffle sandwich maker. The waffle sandwich maker comprises a first waffle plate and a second waffle plate. The first waffle plate is configured to contact the food product during preparation of the food product. The first waffle plate includes a plurality of protrusions defining a plurality of channels, a female connector having a hole, a male connector having a protrusion and a first spacer extending inward relative to the plurality of protrusions. The second waffle plate is also configured to contact the food product during preparation of the food product. The second waffle plate also includes a plurality of protrusions defining a plurality of channels, a female connector having a hole and a male connector having a protrusion. The pluralities of protrusions and channels are configured to create depressions and ridges in the food product. The protrusion of the male connector of the first waffle plate is configured to mate with the hole of the female connector of the second waffle plate, and the hole of the female connector of the first waffle plate is configured to mate with the protrusion of the male connector of the second waffle plate. The first spacer is configured to contact the second waffle plate during preparation of the food product such that the plurality of protrusions of the first waffle plate are spaced from the plurality of protrusions of the second waffle plate.

Preferably, the first spacer is part of the female connector or the male connector of the first waffle plate. When the first spacer is part of the female connector of the first waffle plate, the first spacer surrounds the hole of the female connector of the first waffle plate. When the first spacer is part of the male connector of the first waffle plate, the protrusion of the male connector of the first waffle plate extends inward from the first spacer. In one embodiment, the first waffle plate further includes a second spacer extending inward relative to the plurality of protrusions of the first waffle plate, the second spacer being configured to contact the second waffle plate during preparation of the food product such that the plurality of protrusions of the first waffle plate are spaced from the plurality of protrusions of the second waffle plate. The first spacer is part of the female connector of the first waffle plate, and the second spacer is part of the male connector of the first waffle plate. The protrusion of the male connector of the first waffle plate extends inward from the second spacer.

Preferably, the first spacer is configured to contact a spacer of the second waffle plate during preparation of the food product, the spacer of the second waffle plate extending inward relative to the plurality of protrusions of the second waffle plate. The first spacer is particularly configured to contact the second waffle plate during preparation of the food product such that the plurality of protrusions of the first waffle plate are spaced from the plurality of protrusions of the second waffle plate by at least approximately 0.5 inches.

Waffle plates constructed in accordance with the invention can also be conveniently stacked. In particular, the male connector of the first waffle plate is configured to receive the protrusion of the male connector of the second waffle plate when the first waffle plate is stacked on top of the second waffle plate. An interior of the male connector of the first waffle plate has a first portion with a first diameter and a second portion with a second diameter, the first diameter being greater than the second diameter. When the first waffle plate is stacked on top of the second waffle plate, the protrusion of the male connector of the second waffle plate fits inside and contacts the second portion, and the protrusion of the male connector of the second waffle plate fits inside but does not contact the first portion.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms.

The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. In addition, any specific numerical value listed herein includes a margin of error of +/−5%. Accordingly, a length of 1.0 inch includes lengths between 0.95 and 1.05 inches. Similarly, a range of 0.8-1.2 inches includes lengths between 0.76 and 1.26 inches. The term "approximately" increases the margin of error to 10%.

Figure 1:
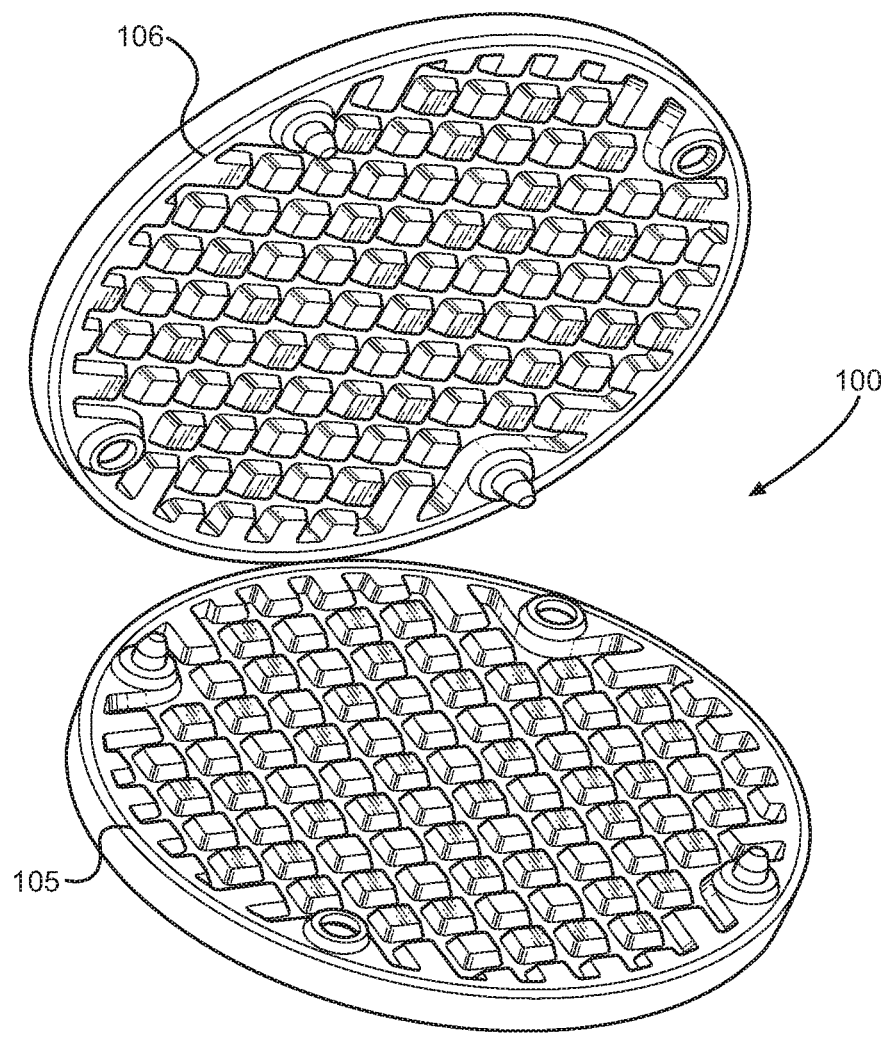
FIG. 1 is a perspective view of a waffle sandwich maker constructed in accordance with the present invention.

With initial reference to FIG. 1, a perspective view of a waffle sandwich maker 100 constructed in accordance with the present invention is provided. Waffle sandwich maker 100 includes a pair of waffle plates 105, 106. However, waffle sandwich maker 100 can include multiple pairs of waffle plates if desired, e.g., 2, 3 or 4 pairs. In use, plates 105 and 106 are directly coupled to one another, with a food product located in between, as will be discussed in more detail below.

Figure 2A:
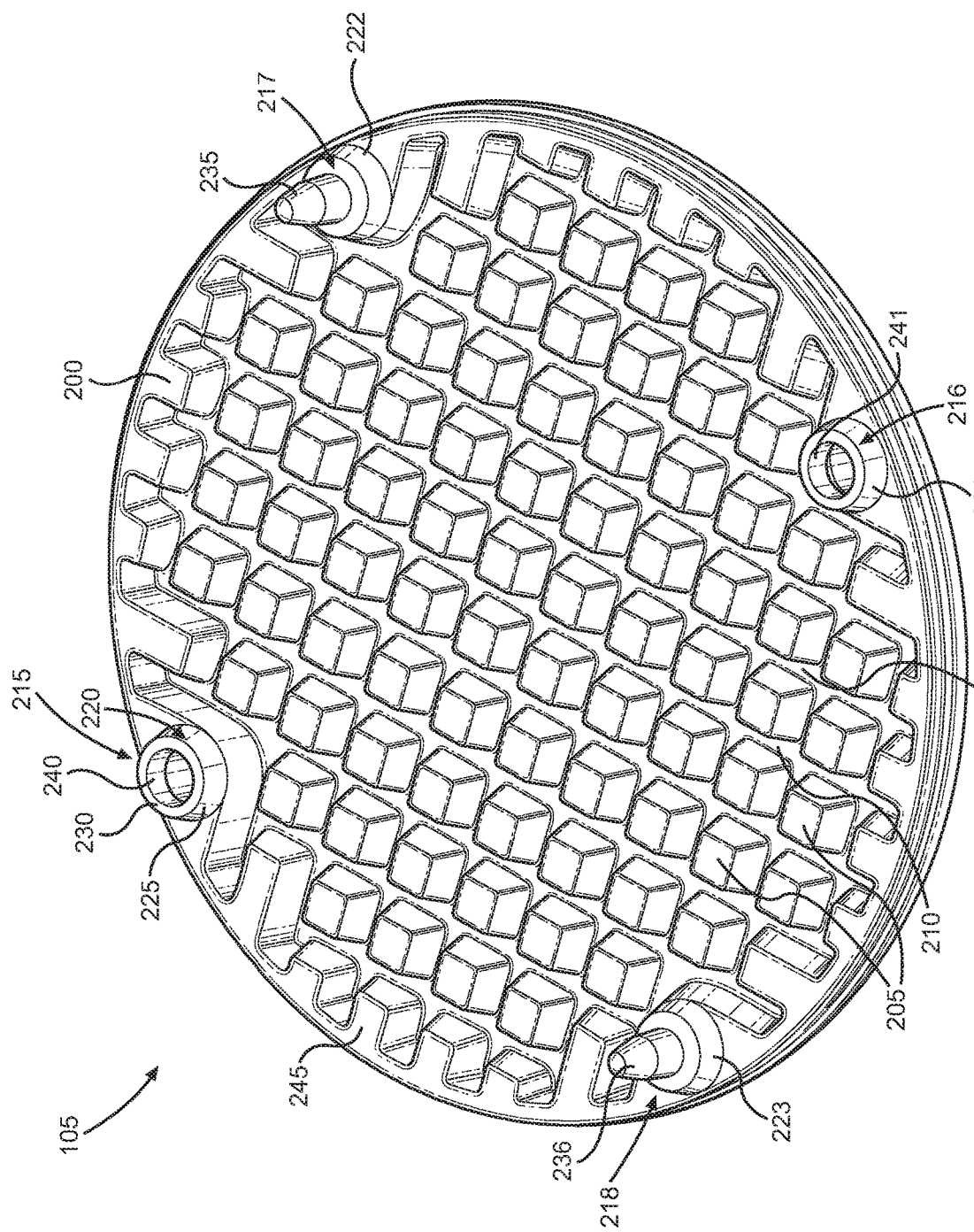
FIG. 2A is a perspective view of an interior side of a waffle plate of the waffle sandwich maker.

With reference now to FIG. 2A, a perspective view of an interior side 200 of plate 105 is provided. By interior side, it is meant the side of plate 105 facing toward plate 106 when plates 105 and 106 are brought into contact with a food product. Accordingly, by exterior side, it is meant the side of plate 105 facing away from plate 106 when plates 105 and 106 are brought into contact with a food product. Although plate 105 is shown, plate 106 is preferably constructed in an identical manner. Plate 105 includes a plurality of protrusions 205 arranged in spaced rows and columns. A plurality of channels 210 are defined by protrusions 205. When placed in contact with a food product (not shown), protrusions 205 and channels 210 result in the food product taking on a traditional waffle appearance. That is, protrusions 205 and channels 210 create depressions and ridges, respectively, in the food product. Plate 105 also includes two female connectors 215 and 216 and two male connectors 217 and 218. Connectors 215-218 have corresponding spacers (or rims) 220-223. Since connectors 215-218 are located on interior side 200 of plate 105, spacers 220-223 are considered to extend inward relative to protrusions 205. Each of spacers 220-223 has a side surface and an inner surface. For example, spacer 220 has a side surface 225 and an inner surface 230.

Male connectors 217 and 218 also have protrusions 235 and 236 extending further inward relative to spacers 222 and 223. Protrusions 235 and 236 are configured (i.e., shaped) to mate with holes 240 and 241 formed in female connectors 215 and 216. To facilitate this mating, protrusions 235 and 236 are tapered. However, it should be recognized that protrusions 235 and 236 of plate 105 cannot actually mate with holes 240 and 241 of plate 105. Instead, protrusions 235 and 236 of plate 105 extend into corresponding holes formed in female connectors of plate 106, as will be described below.

To provide for easy cleaning of plate 105, plate 105 is preferably coated with a non-stick coating 245. Also, the various edges of plate 105 (e.g., the edges of protrusions 205 and spacers 220-223) are rounded. In addition to facilitating the cleaning of plate 105, the rounded edges help prevent plate 105 from damaging plate 106 when plates 105 and 106 are brought into contact.

Figure 2B:
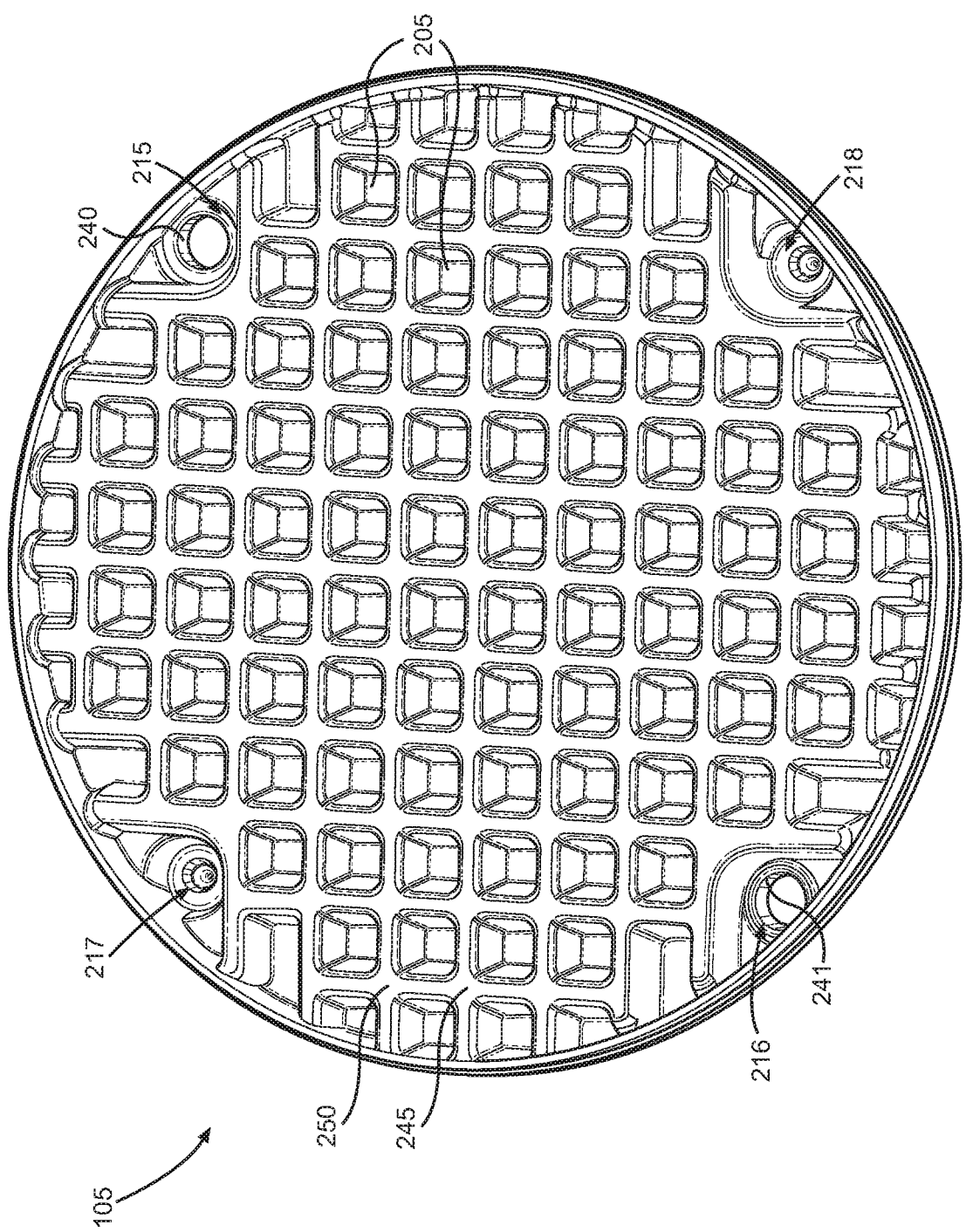
FIG. 2B is a perspective view of an exterior side of the waffle plate.

With reference now to FIG. 2B, a perspective view of an exterior side 250 of plate 105 is provided. As can be seen from this view, protrusions 205 and male connectors 217 and 218 are hollow. This reduces the weight of plate 105 and provides for even heating of food products placed in contact with plate 105. This arrangement also means that plates 105 and 106 can be stacked when not in use, as will be discussed in more detail below. As with interior side 200, exterior side 250 of plate 105 is coated with non-stick coating 245 to allow for easy cleaning. The view of FIG. 2B also highlights the rounded edges of plate 105, which, as discussed above, facilitate cleaning of plate 105 and help prevent plate 105 from damaging plate 106. Preferably, plate 105 is made by casting aluminum into the desired shape. However, plate 105 can be made by other processes and from other materials. Preferably, waffle plate 105 is approximately 10 or 12 inches in diameter.

Figure 3:
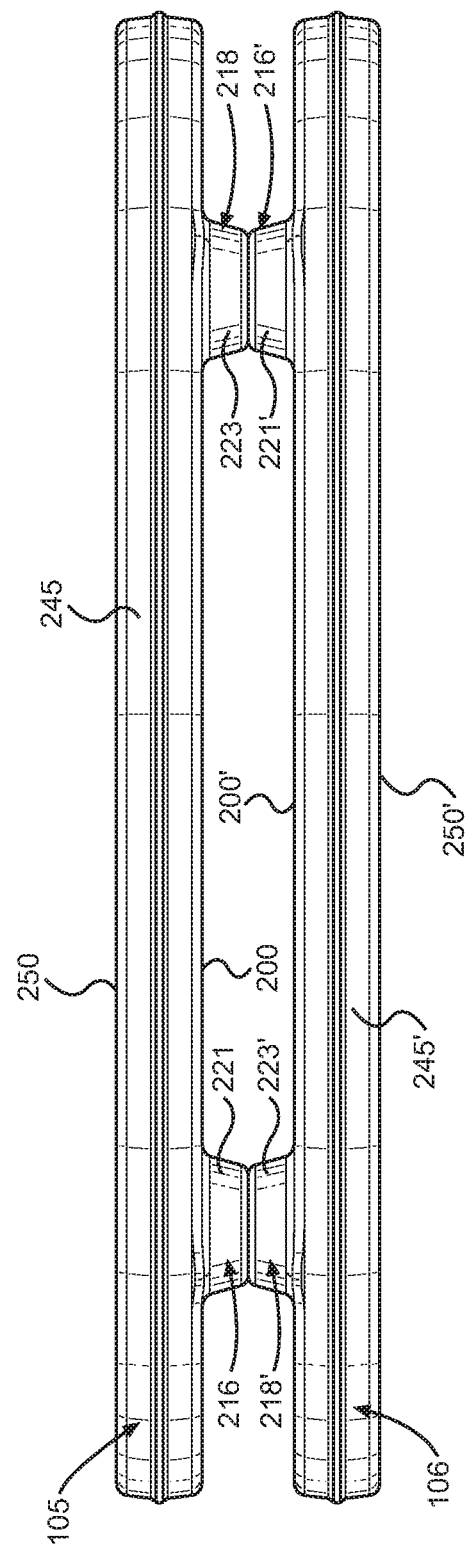
FIG. 3 is a side view of two waffle plates coupled to one another in an in-use position.

With reference now to FIG. 3, a side view of plates 105 and 106 coupled to one another in an in-use (or proofing) position is provided. Unlike in a conventional waffle maker, plates 105 and 106 are spaced from one another. This is because waffle sandwich maker 100 is not used to make waffles. Instead, waffle sandwich maker 100 is designed for use in preparing a waffle-like breakfast sandwich having an outer dough envelope in which is fully contained a filling. The gap between plates 105 and 106 is small enough to allow the dough of the sandwich to fill the channels of plates 105 and 106 (e.g., channels 210) as the dough proofs. However, the gap is also big enough to prevent the sandwich from being compressed to such a degree that its filling escapes. Since waffle batter is not being used, it does not matter that the gap between plates 105 and 106 extends all the way to the edges thereof. In other words, there is no concern that the sandwich could leak out from between plates 105 and 106.

The spacing of plates 105 and 106 from one another is accomplished using connectors 215-218 of plate 105 and corresponding connectors of plate 106 (e.g., connectors 216' and 218'). The connectors of plate 106 are identical to connectors 215-218. Accordingly, when plates 105 and 106 are placed adjacent to one another and offset rotationally by 90 degrees, protrusions 235 and 236 of plate 105 extend into holes (not visible) formed in the female connectors of plate 106 (e.g., connector 216'). Similarly, protrusions (not visible) of the male connectors of plate 106 (e.g., connector 218') extend into holes 240 and 241. In addition, spacers 220-223 of plate 105 contact corresponding spacers of plate 106 (e.g., spacers 221' and 223') to space protrusions 205 of plate 105 from corresponding protrusions of plate 106. This spacing is due to the fact that spacers 220-223 of plate 105 and the spacers of plate 106 extend inward relative to their respective protrusions (e.g., protrusions 205). In one embodiment, each of spacers 220-223 and the spacers of plate 106 extends inward by 0.375 inches. Accordingly, a space of 0.75 inches is created between protrusions 205 and the protrusions of plate 106. Preferably, each of spacers 220-223 and the spacers of plate 106 extends inward by at least approximately 0.25 inches such that a space of at least approximately 0.5 inches is created.

Figure 4:
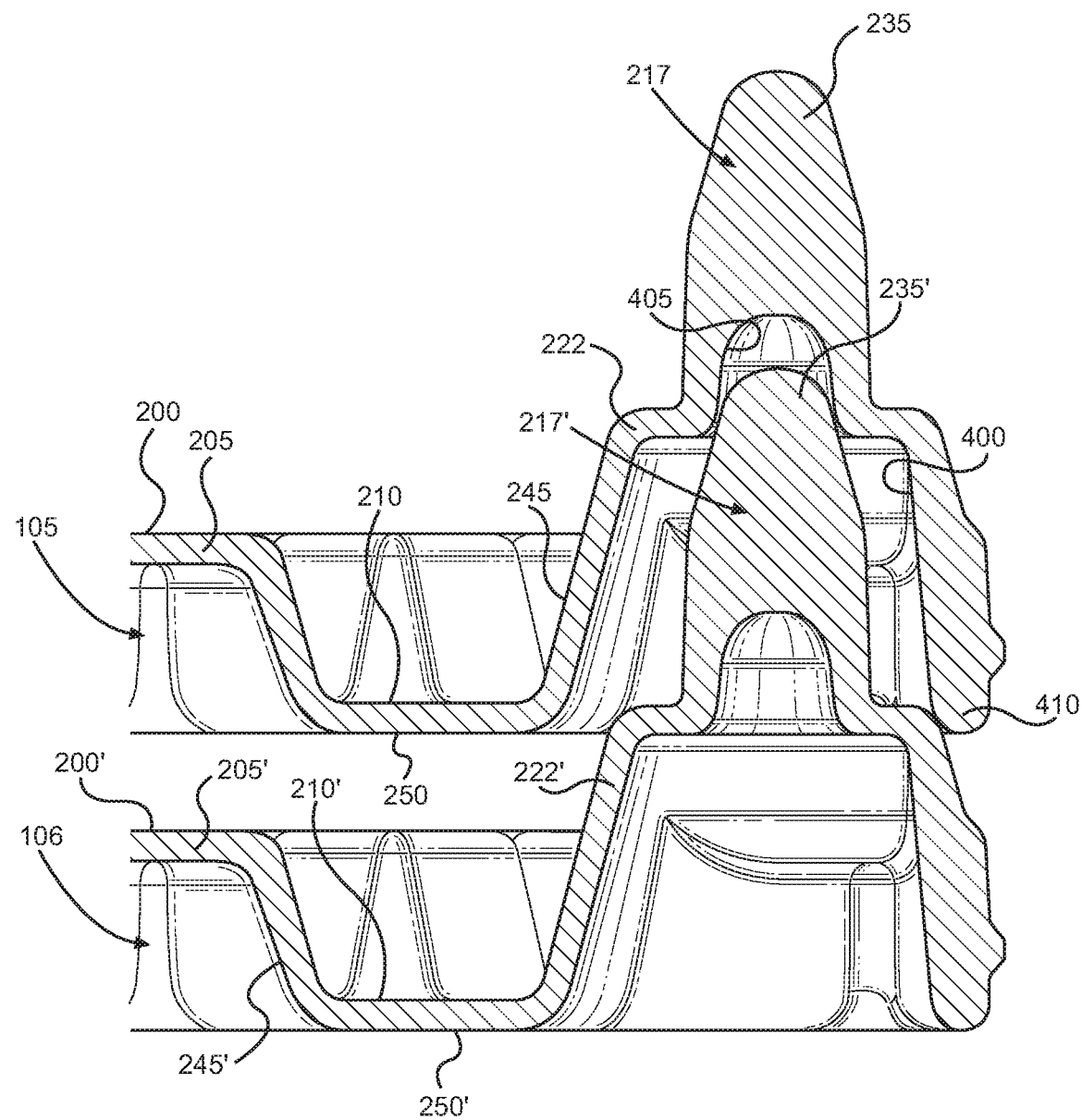
FIG. 4 is a cross section of the two waffle plates in a stacked storage position.

With reference now to FIG. 4, a cross section of plates 105 and 106 in a stacked storage position is provided. As referenced above, plates 105 and 106 can be stacked when not in use mainly because male connectors 217 and 218 are generally hollow. Specifically, the protrusions of one plate (e.g., plate 106) can fit inside the male connector of another plate (e.g., plate 105) to reduce the vertical space necessary for stacking and provide a stable structure. This makes it easier to store and transport plates 105 and 106. In FIG. 4, a protrusion 235' of plate 106 is shown inside male connector 217 of plate 105. The interior of male connector 217 has a first portion 400 with a relatively larger diameter and a second portion 405 with a relative smaller diameter. The tapered portion of protrusion 235' fits inside and contacts portion 405 to align plates 105 and 106 and prevent horizontal movement of plates 105 and 106 relative to one another. Protrusion 235' also fits inside portion 400 but does not contact portion 400. Instead, an outer edge 410 of plate 105 contact spacer 222' of male connector 217' to help support plate 105 upon plate 106. This arrangement reduces the number of contact points between plates 105 and 106 when plates 105 and 106 are stacked, thereby reducing wear.

Figure 5:
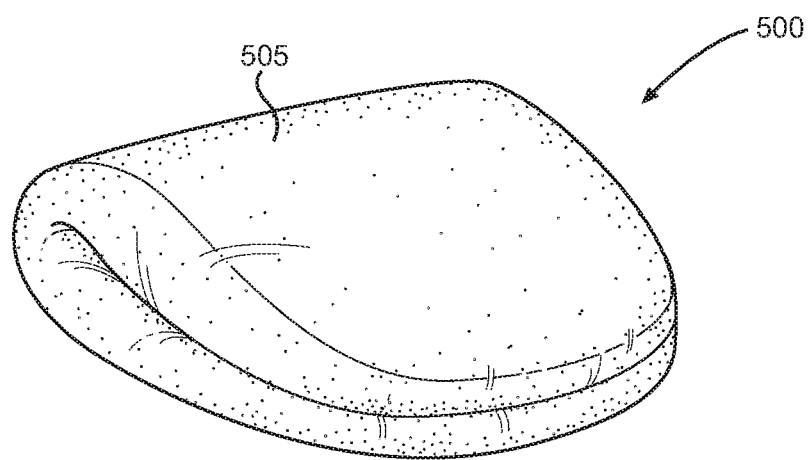
FIG. 5 is a perspective view of a breakfast food product, usable in connection with the waffle sandwich maker, before proofing.
Figure 6:
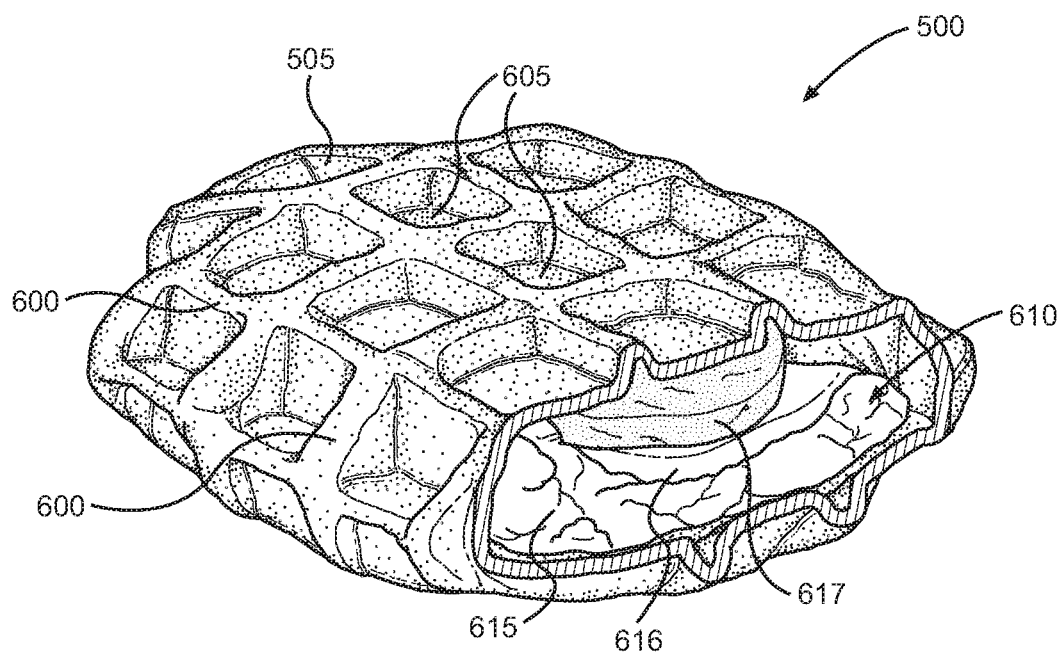
FIG. 6 is a partial cross section of the breakfast food product after proofing.

With reference now to FIG. 5, a perspective view of a breakfast food product 500 usable in connection with waffle sandwich maker 100 is provided. Specifically, product 500 is a filled breakfast sandwich (i.e., a breakfast sandwich having a filling) that has not yet been proofed in waffle sandwich maker 100. Exemplary product 500 includes a sweet maple syrup-flavored dough 505 surrounding a layered filling of egg, cheese and sausage (not visible). Preferably, in terms of ingredients, dough 505 generally represents a waffle batter in dough form. However, it should be recognized that other doughs and fillings can be used. It should also be recognized that other types of food products can be used in connection with waffle sandwich maker 100 (e.g., unfilled doughs). Once proofed in waffle sandwich maker 100, product 500 has the distinctive ridges and depressions of a waffle, as shown in FIG. 6. In particular, product 500 has a plurality of ridges 600 and a plurality of depressions 605. Due to the spacing of protrusions 205' of plate 105 from protrusions 205 of plate 106, product 500 is not overly compressed during preparation such that the filling of product 500 does not leak out. To show this filling, product 500 is presented in partial cross section in FIG. 6. Accordingly, a layered filling 610 is visible. As discussed above, filling 610 can include egg 615, cheese 616 and sausage 617.

Figure 7:
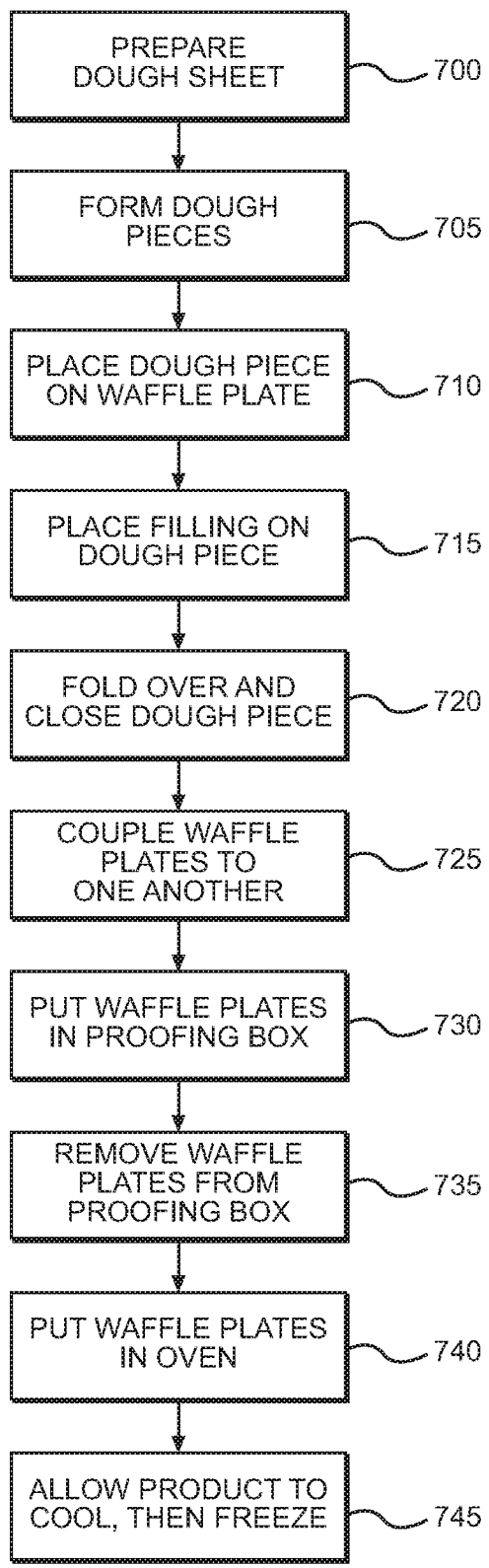
FIG. 7 is a schematic view of a process for preparing the breakfast food product.

With reference now to FIG. 7, a schematic view of a process for preparing product 500 is provided. At step 700, a dough sheet is prepared and, at step 705, round dough pieces are formed from the dough sheet. At step 710, one of the dough pieces is placed on plate 105 and, at step 715, filling 610 is placed on the dough piece. Preferably, egg 615 and sausage 617 of filling 610 are already cooked at this point. At step 720, the dough piece is folded over filling 610 and crimped closed to form product 500. Alternatively, product 500 is formed elsewhere and then placed on plate 105. In either case, the location and/or orientation of product 500 on plate 105 preferably varies between products such that each product has a different appearance. In addition, multiple products 500 can be simultaneously produced on plate 105, e.g., four products each taking one-quarter of the space of plate 105. At step 725, waffle plate 106 is coupled to waffle plate 105 and, at step 730, waffle plates 105 and 106 are put into a proofing box where dough 505 of product 500 is heated and allowed to proof. As dough 505 expands, dough 505 comes into contact with protrusions 205 and 205' and enters channels 210 and 210' to form ridges 600 and depressions 605. Preferably, the proofing box is maintained at approximately 100° F. and 60% humidity. Once dough 505 reaches approximately 80° F., waffle plates 105 and 106 are removed from the proofing box at step 735. At step 740, waffle plates 105 and 106 are put into an oven, which is maintained at 165° F. Afterwards, at step 745, product 500 is allowed to cool and then frozen. After packaging, transport and sale, product 500 is reheated prior to consumption. If product 500 is purchased by a consumer at a grocery store, for example, this reheating can take place in an oven or microwave located at the consumer's home or office. Alternatively, if product 500 is purchased by a consumer from a convenience store, for example, this reheating can be performed in a combination radiant/convection/microwave oven located at the convenience store.

Based on the above, it should be readily apparent that the present invention provides a non-traditional breakfast food product that is portable and easy to eat. Beneficially, the plates used to prepare the food product do not cause the food product's filling to leak out but rather the filling is completely encapsulated by the outer dough. In addition, the plates provide for quick and even heating, are easy to clean and are usable with existing production equipment. Although described with reference to preferred embodiments, it should be readily understood that various changes or modifications could be made to the invention without departing from the spirit thereof. For example, plates 105 and 106 can have more or fewer connectors. Also, plates 105 and 106 need not be identical. In general, the invention is only intended to be limited by the scope of the following claims.

The invention claimed is:
1. A waffle sandwich maker comprising:
a first waffle plate, the first waffle plate being configured to contact a food product during preparation of the food product with the waffle sandwich maker, the first waffle plate including:
a plurality of protrusions, the plurality of protrusions defining a plurality of channels, wherein the pluralities of protrusions and channels are configured to create depressions and ridges in the food product;
a female connector having a hole;
a male connector having a protrusion; and
at least one spacer extending inward relative to the plurality of protrusions; and
a second waffle plate, the second waffle plate being configured to contact the food product during preparation of the food product with the waffle sandwich maker, the second waffle plate including:
a plurality of protrusions, the plurality of protrusions defining a plurality of channels, wherein the pluralities of protrusions and channels are configured to create depressions and ridges in the food product;
a female connector having a hole;
a male connector having a protrusion; and
at least one spacer extending inward relative to the plurality of protrusions of the second waffle plate, wherein the at least one spacer of the first waffle plate is configured to contact the at least one spacer of the second waffle plate during preparation of the food product to space the plurality of protrusions of the first waffle plate from the plurality of protrusions of the second waffle plate, and wherein the protrusion of the male connector of the first waffle plate is configured to mate with the hole of the female connector of the second waffle plate, and the hole of the female connector of the first waffle plate is configured to mate with the protrusion of the male connector of the second waffle plate.
2. The waffle sandwich maker of claim 1, wherein the at least one spacer of the first waffle plate mandates a space between the plurality of protrusions of the first waffle plate and the plurality of protrusions the second waffle plate of approximately 0.75 inches.
3. The waffle sandwich maker of claim 1, wherein the at least one spacer is part of the female connector or the male connector of the first waffle plate.

4. The waffle sandwich maker of claim 1, wherein the at least one spacer includes a first spacer and the first spacer is part of the female connector of the first waffle plate and surrounds the hole of the female connector of the first waffle plate; or the first spacer is part of the male connector of the first waffle plate, and the protrusion of the male connector of the first waffle plate extends inward from the first spacer.

5. The waffle sandwich maker of claim 4, wherein the at least one spacer further includes a second spacer extending inward relative to the plurality of protrusions of the first waffle plate, the second spacer being configured to contact the second waffle plate during preparation of the food product such that the plurality of protrusions of the first waffle plate is spaced from the plurality of protrusions of the second waffle plate;

the first spacer is part of the female connector of the first waffle plate;

the second spacer is part of the male connector of the first waffle plate; and the protrusion of the male connector of the first waffle plate extends inward from the second spacer.

6. The waffle sandwich maker of claim 1, wherein the at least one spacer of the first waffle plate is configured to contact the at least one spacer of the second waffle plate during preparation of the food product to space the plurality of protrusions of the first waffle plate from the plurality of protrusions of the second waffle plate by at least approximately 0.5 inches.

7. A waffle sandwich maker comprising:

a first waffle plate, the first waffle plate being configured to contact a food product during preparation of the food product with the waffle sandwich maker, the first waffle plate including:

a plurality of protrusions, the plurality of protrusions defining a plurality of channels, wherein the pluralities of protrusions and channels are configured to create depressions and ridges in the food product;

a male connector having a protrusion; and at least one spacer extending inward relative to the plurality of protrusions; and a second waffle plate, the second waffle plate being configured to contact the food product during preparation of the food product with the waffle sandwich maker, the second waffle plate including:

a plurality of protrusions, the plurality of protrusions defining a plurality of channels, wherein the pluralities of protrusions and channels are configured to create depressions and ridges in the food product;

a male connector having a protrusion; and at least one spacer extending inward relative to the plurality of protrusions of the second waffle plate, wherein the at least one spacer of the first waffle plate is configured to contact the at least one spacer of the second waffle plate during preparation of the food product to space the plurality of protrusions of the first waffle plate from the plurality of protrusions of the second waffle plate, wherein the male connector of the first waffle plate is configured to receive the protrusion of the male connector of the second waffle plate when the first waffle plate is stacked on top of the second waffle plate.

8. The waffle sandwich maker of claim 7, wherein an interior of the male connector of the first waffle plate has a first portion with a first diameter and a second portion with a second diameter;

the first diameter is greater than the second diameter;

when the first waffle plate is stacked on top of the second waffle plate, the protrusion of the male connector of the second waffle plate fits inside and contacts the second portion; and when the first waffle plate is stacked on top of the second waffle plate, the protrusion of the male connector of the second waffle plate fits inside but does not contact the first portion.

9. A waffle plate configured to contact a food product during preparation of the food product with a waffle sandwich maker including the waffle plate and another waffle plate, the waffle plate comprising:

a plurality of protrusions, the plurality of protrusions defining a plurality of channels, wherein the pluralities of protrusions and channels are configured to create depressions and ridges in the food product; and at least one spacer extending inward relative to the plurality of protrusions, wherein the at least one spacer is configured to maintain contact with the another waffle plate throughout preparation of the food product to space the plurality of protrusions of the waffle plate from the another waffle plate, wherein the waffle plate includes a female connector having a hole and a male connector having a protrusion, the protrusion of the male connector of the waffle plate is configured to mate with a hole of a female connector of the another waffle plate, the hole of the female connector of the waffle plate is configured to mate with a protrusion of a male connector of the another waffle plate, and the at least one spacer is configured to contact the another waffle plate during preparation of the food product such that the plurality of protrusions of the waffle plate are spaced from a plurality of protrusions of the another waffle plate.

10. The waffle plate of claim 9, wherein the at least one spacer mandates a space between the plurality of protrusions of the waffle plate and the another waffle plate of approximately 0.75 inches.

11. The waffle plate of claim 10, wherein the at least one spacer is part of the female connector or the male connector of the waffle plate.

12. The waffle plate of claim 10, wherein the at least one spacer includes a first spacer and the first spacer is part of the female connector of the waffle plate, and the first spacer surrounds the hole of the female connector of the waffle plate; or the first spacer is part of the male connector of the waffle plate, and the protrusion of the male connector of the waffle plate extends inward from the first spacer.

13. The waffle plate of claim 12, wherein the at least one spacer includes a second spacer extending inward relative to the plurality of protrusions of the waffle plate, the second spacer being configured to contact the another waffle plate during preparation of the food product such that the plurality of protrusions of the waffle plate is spaced from the plurality of protrusions of the another waffle plate, wherein the first spacer is part of the female connector of the waffle plate;

the second spacer is part of the male connector of the waffle plate; and the protrusion of the male connector of the waffle plate extends inward from the second spacer.

14. A method of preparing a food product with a waffle sandwich maker including first and second waffle plates, with the first waffle plate being configured to contact a food product during preparation of the food product with the waffle sandwich maker and including a plurality of protrusions defining a plurality of channels, wherein the pluralities of protrusions and channels are configured to create depressions and ridges in the food product, and at least one spacer extending inward relative to the plurality of protrusions, wherein the at least one spacer is configured to maintain contact with the second waffle plate throughout preparation of the food product to space the plurality of protrusions of the first waffle plate from the second waffle plate at a constant spacing, wherein the waffle plate includes a female connector having a hole and a male connector having a protrusion, the protrusion of the male connector of the waffle plate is configured to mate with a hole of a female connector of the another waffle plate, the hole of the female connector of the waffle plate is configured to mate with a protrusion of a male connector of the another waffle plate, and the at least one spacer is configured to contact the another waffle plate during preparation of the food product such that the plurality of protrusions of the waffle plate are spaced from a plurality of protrusions of the another waffle plate, the method comprising:

supporting the food product, including an outer dough enveloping an inner filling, on the first waffle plate;

coupling the first waffle plate to the second waffle plate whereupon the at least one spacer contacts the second waffle plate such that the plurality of protrusions of the first waffle plate are spaced from the second waffle plate; and expanding the dough between the first and second waffle plates, thereby creating depressions and ridges in the dough of the food product with the pluralities of protrusions and channels of the first waffle plate while fully encapsulating the inner filling with dough.

15. The method of claim 14, further comprising: maintaining a space between the plurality of protrusions of the first waffle plate and the second waffle plate of at least approximately 0.5 inches with the at least one spacer.

16. The method of claim 15, and coupling the first waffle plate to the second waffle plate includes:

mating the protrusion of the male connector of the first waffle plate with the hole of the female connector of the second waffle plate; and mating the hole of the female connector of the first waffle plate with the protrusion of the male connector of the second waffle plate.

17. The method of claim 16, wherein:

the at least one spacer is part of the female connector of the first waffle plate, and the at least one spacer surrounds the hole of the female connector of the first waffle plate; or the at least one spacer is part of the male connector of the first waffle plate, and the protrusion of the male connector of the first waffle plate extends inward from the at least one spacer.

18. The method of claim 16, wherein the inner filling includes at least one of egg, cheese and sausage.

\* \* \* \* \*